United States Patent
Buchwald et al.

(10) Patent No.: US 7,818,011 B2
(45) Date of Patent: Oct. 19, 2010

(54) METHOD AND APPARATUS FOR CHANNEL SELECTION

(75) Inventors: Gregory J. Buchwald, Crystal Lake, IL (US); Lawrence M. Ecklund, Wheaton, IL (US); Stephen L. Kuffner, Algonquin, IL (US)

(73) Assignee: Motorola, Inc., Schaumburg, IL (US)

( * ) Notice: Subject to any disclaimer, the term of this patent is extended or adjusted under 35 U.S.C. 154(b) by 462 days.

(21) Appl. No.: 11/457,363

(22) Filed: Jul. 13, 2006

(65) Prior Publication Data

US 2008/0013517 A1   Jan. 17, 2008

(51) Int. Cl.
*H04W 72/00*   (2009.01)
(52) U.S. Cl. .................... 455/450; 455/403; 455/422.1; 455/454; 370/431
(58) Field of Classification Search ............. 370/431; 455/403, 422.1, 434, 445, 446, 462, 464, 455/450, 454
See application file for complete search history.

(56) References Cited

U.S. PATENT DOCUMENTS

2003/0130001 A1* 7/2003 Weisshaar et al. .......... 455/510
2005/0119006 A1* 6/2005 Cave et al. ................. 455/453
2007/0133482 A1* 6/2007 Grannan .................... 370/338

OTHER PUBLICATIONS

Dajana Cassioli, "The role of path loss on the selection of the operating bands of UWB systems", Personal, Indoor and Mobile Radio Communication, 2004, PIMRC 2004, 15th IEEE international Symposium on, vol. 4, Sep. 5-8, 2004 pp. 2789-2791.*
Greg Durgin, "Measurments and Models for Radio Path Loss and Penetration Loss In and Around Homes and Trees at 5.85 GHz", IEEE Transactions on Communications, vol. 46, No. 11, Nov. 1998.*
Y.P.Zhang, "Measurements of the Characteristics of Inddor Penetration Loss", Vehicular Technology Conference, 1994 IEEE 44th.*

* cited by examiner

Primary Examiner—William Trost, IV
Assistant Examiner—Siming Liu
(74) Attorney, Agent, or Firm—Kenneth Haas; Barbara R. Doutre

(57) ABSTRACT

The radio frequency (RF) environment is scanned and analyzed prior to entering a building or otherwise non-ideal propagation path environment. Upon entering the building or non-ideal propagation path environment, the mobile unit will scan the RF environment from within the building. An attenuation factor is determined for various frequencies. A channel then chosen to operate on in the cognitive system based on the attenuations of the various frequencies.

11 Claims, 4 Drawing Sheets

100

300

METHOD AND APPARATUS FOR CHANNEL SELECTION

FIELD OF THE INVENTION

The present invention relates generally to channel selection and in particular, to a method and apparatus for channel selection within a cognitive radio system.

BACKGROUND OF THE INVENTION

When radio transmissions are broadcast in free space, it is generally accepted that lower frequencies will propagate better than higher frequencies. However, when a radio signal propagates through a building or structure, other factors such as aperture sizes, boundary conditions and material constants come into play that may modify the propagation such that there may be a frequency that is optimal (in the minimum path loss sense) for a given structure that may not be the lowest frequency. For example, the propagation through buildings via waveguide effects may cause higher frequencies to propagate better than lower frequencies; an air handling system in a building may act as a waveguide below cutoff at VHF, but may duct a signal at 650 MHz out of the building with acceptable efficiency.

In a cognitive radio system, which may communicate within one of many frequency bands, a problem exists in how to choose the best frequency band for operation. As mentioned, simply choosing the lowest frequency band may be inadequate for communications within structures. Therefore, a need exists for a method and apparatus for channel selection that adequately chooses the minimum path loss frequency band for operation.

DETAILED DESCRIPTION OF THE DRAWINGS

Figure 1:
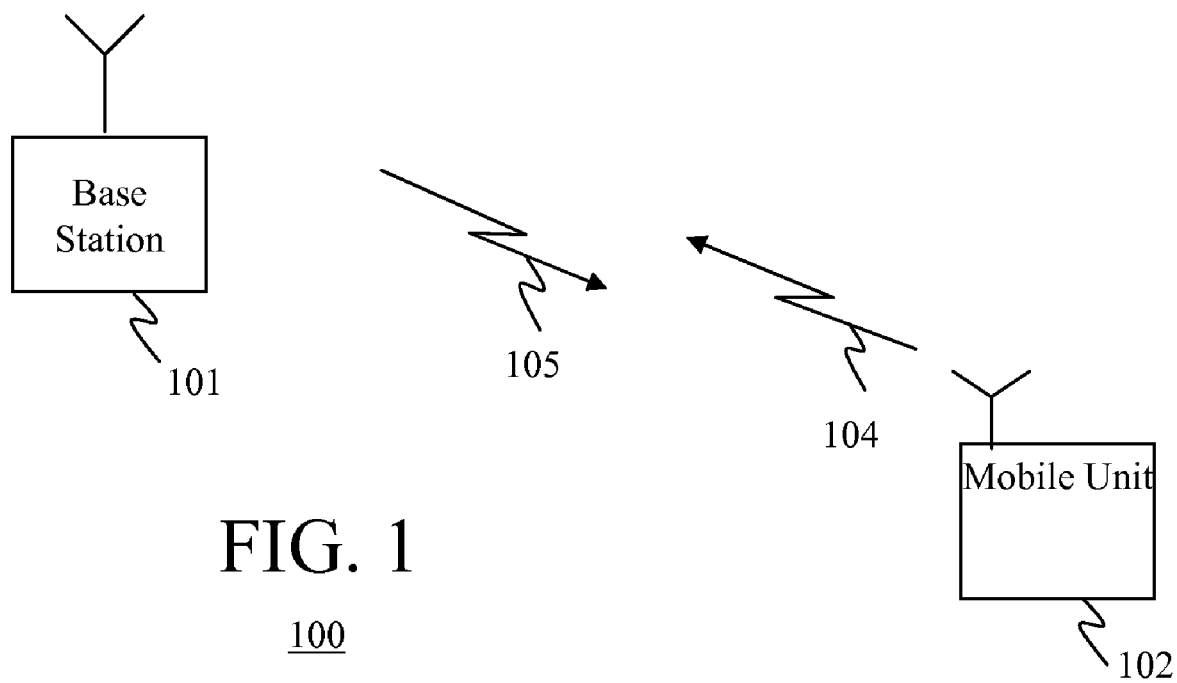
FIG. 1 is a block diagram of a communication system.

In order to address the above-mentioned need, a method and apparatus for channel selection is provided herein. During operation, the radio frequency (RF) environment is scanned and analyzed prior to entering a building or other non-ideal propagation path environment. Upon entering the building or non-ideal propagation path environment, the mobile unit will scan the RF environment from within the building or non-ideal propagation path environment. Attenuation is determined for various frequencies. A frequency/channel is then chosen for operation in the cognitive system based on the attenuations at the various frequencies.

It should be noted that when scanning the RF environment, the channels scanned are not necessarily channels within the domain of the cognitive radio system. The channels may be television, cellular/PCS, land mobile, broadcast radio, and/or other channels. Thus, the scanned channels may comprise spectrum which includes any channel in which a user is not licensed to utilize.

This above technique eliminates, or at least substantially reduces, the need to "chirp" a channel to determine a frequency or set of frequencies that are best suited to the environment at that moment in time. The above technique for channel selection also allows the channel to be periodically reviewed to maintain optimal choices of all operating conditions while operational.

The present invention encompasses a method for determining a frequency band for operation within a communication system. The method comprises the steps of determining first receive powers for a plurality of signals transmitted over various frequencies. This determination is made from outside a structure or non-optimal RF environment. Second receive powers are then determined for the plurality of signals transmitted over the various frequencies. This determination is made from inside the structure or non-optimal RF environment. The first and the second receive powers are compared and a best frequency for operation is determined based on the comparison.

The present invention additionally encompasses a method for determining a frequency band for operation for a communication system. The method comprises the steps of determining receive powers for a plurality of signals transmitted over various frequencies. This determination is made from inside a structure or non-optimal RF environment. Information is transmitted on the receive powers for the plurality of signals to a base station and a frequency for transmission is received.

The present invention additionally encompasses an apparatus for determining a frequency band for operation. The apparatus comprises a spectrum analyzer determining first receive powers for a plurality of signals transmitted over various frequencies, wherein the determination is made from outside a structure or non-optimal RF environment. The spectrum analyzer additionally determines second receive powers for the plurality of signals transmitted over the various frequencies, wherein the determination is made from inside the structure or non-optimal RF environment. Logic circuitry is provided for comparing the first and the second receive powers and determining a best frequency for operation based on the comparison.

The present invention additionally encompasses an apparatus comprising a spectrum analyzer determining first receive powers for a plurality of signals transmitted over various frequencies, wherein the determination is made from outside a structure or non-optimal RF environment. A receiver is provided for receiving second receive powers for the plurality of signals transmitted over the various frequencies, wherein the determination is made from inside the structure or non-optimal RF environment. Logic circuitry is provided for comparing the first and the second receive powers and determining a best frequency for operation based on the comparison. Finally a transmitter is provided for transmitting the best frequency for operation to a mobile unit.

Turning now to the drawings, wherein like numerals designate like components, FIG. 1 is a block diagram of communication system 100. Communication system 100 preferably comprises a cognitive radio system 100 in that communication system 100 can sense the radio environment, and utilize channels that best suit the communication system without interfering with other communication systems. Communication system 100 preferably utilizes a communication system protocol similar to an IEEE 802.22 compliant structure. However, in alternate embodiment's communication system 100 may utilize other communication system protocols such as, but not limited to Bluetooth, IEEE 802.11, or HiperLAN protocols.

As shown, communication system 100 comprises base station 101 and mobile unit 102. Although a single base station 101 and mobile unit 102 are shown in FIG. 1, one of ordinary skill in the art will recognize that a typical cognitive radio system 100 will comprise many base stations 101 in communication with many remote or mobile units 102.

During operation communication takes place from mobile unit 102 to base station 101 via uplink communication signal 104, and communication takes place from base station 101 to mobile unit 102 via downlink communication signal 105. Both uplink and downlink communication signals utilize a channel (or frequency) from a pool of available channels that cover many megahertz (MHz). As discussed above, in a cognitive radio system, which may communicate using one of many frequency bands, a problem exists in how to choose the best frequency/channel for operation. As mentioned, simply choosing the lowest frequency channel may be inadequate for communications within structures.

In order to address this issue, base station 101 or mobile unit 102 will scan the radio frequency (RF) environment for various channels prior to entering a building or otherwise non-ideal propagation path environment. Upon mobile unit 102 entering the non-ideal propagation path environment, the mobile unit 102 will scan the RF environment from within the non-ideal propagation path environment. Attenuation is determined for various frequencies. The closest available channel to that which has the best propagation characteristics (e.g., lowest attenuation) is then preferably chosen to operate on in the cognitive system.

It should be noted that the channels scanned are preferably channels that are not utilized by communication system 100 for uplink or downlink transmissions. Such channels may comprise television channels, cellular channels, land mobile channels, broadcast radio channels, and/or any other channel that lies close in frequency to an available channel utilized by communication system 100 for uplink and downlink communications.

Figure 2:
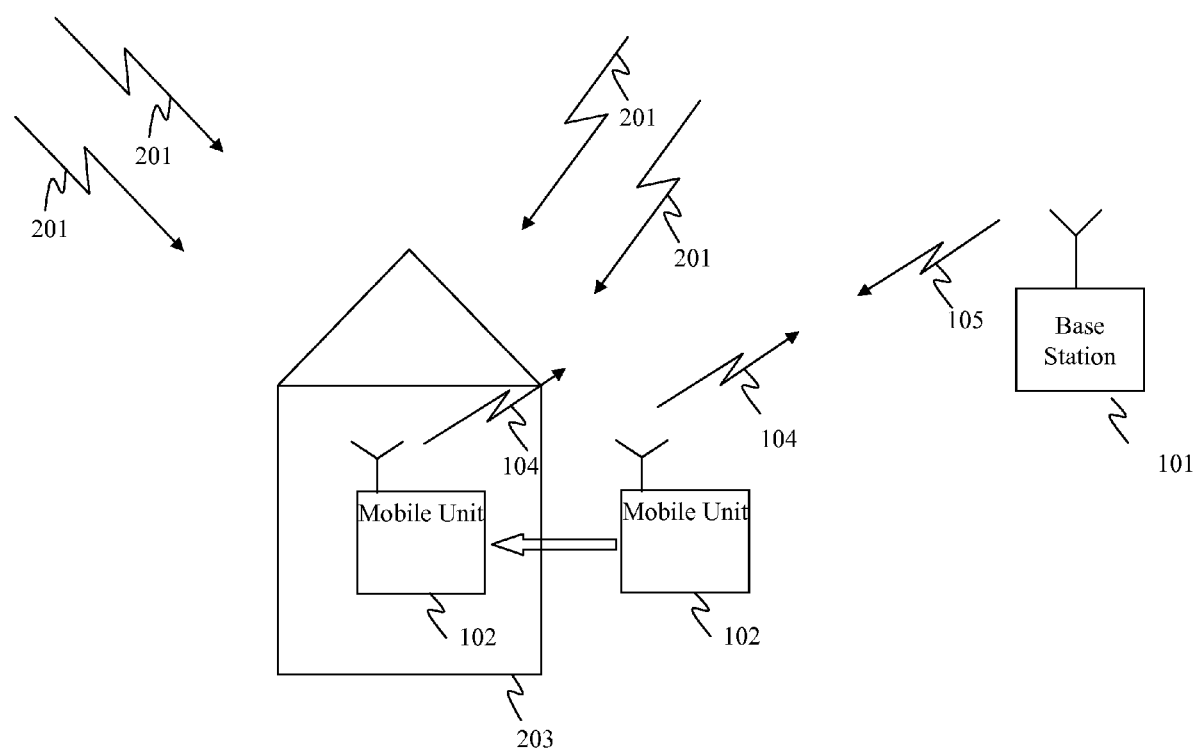
FIG. 2 illustrates a mobile unit moving into a non-ideal RF propagation environment.

The above-described technique is illustrated in FIG. 2. More particularly, FIG. 2 illustrates mobile unit 102 moving into a non-ideal RF propagation environment. As shown, mobile unit 102 exists outside of structure 203 and moves into structure 203. Communication with base station 101 originally takes place via a predetermined control channel via uplink and downlink communication 104 and 105, respectively. When mobile unit 102 is outside structure 203, various channels 201 are scanned to determine a receive power for each channel 201. This scanning may be done by mobile unit 102, or by base station 101. When the scanning is done by mobile unit 102, mobile unit 102 will report the results to base station 101 via control channel transmissions.

Upon entry to structure 203, mobile unit 102 will scan the various channels 201 to determine a receive power for each channel 201. The results of the scan will be reported to base station 101. Base station 101 will then determine a best available uplink and downlink channel for communication, and instruct mobile unit 102 to begin transmissions using the best available uplink and downlink channel.

The determination of the best channel for communication may simply comprise an available channel closest to a scanned channel that shows a least amount of attenuation after entering structure 203. However, other techniques may be utilized to further determine a best channel available for communication. For example, the flatness of the channel under consideration, i.e., determination of the Rayleigh Channel, the level of localized interference, and predictive knowledge of the channel based on input from other communications devices in the same or shared system may also be utilized to augment the raw propagation data.

Figure 3:
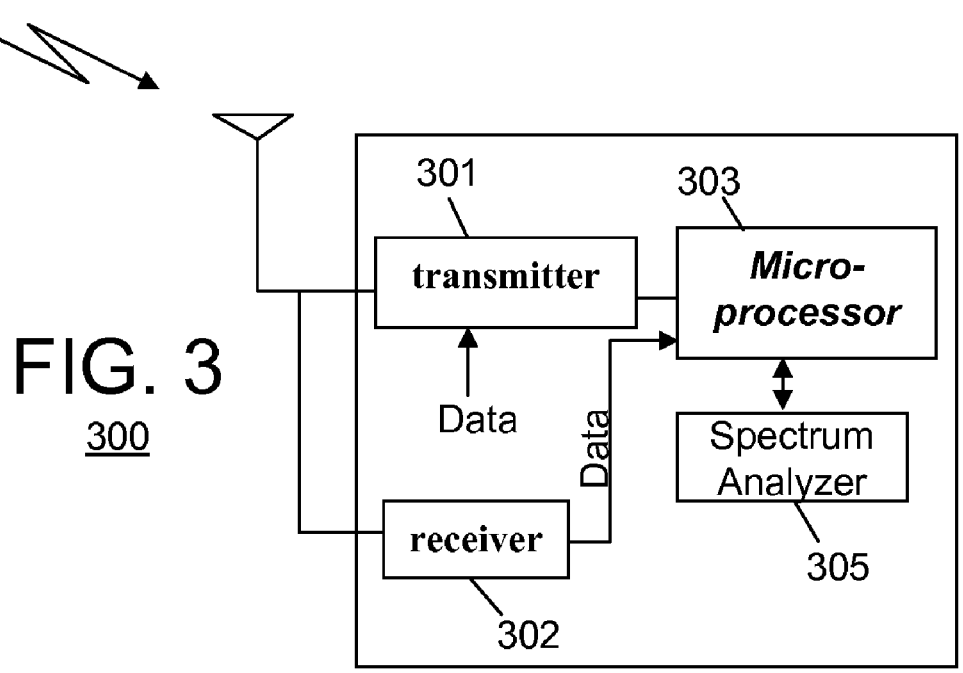
FIG. 3 is a block diagram of a node.

FIG. 3 is a block diagram of transceiver 300 that may be utilized as either a base station or a mobile unit. As shown, transceiver 300 comprises logic circuitry 303 (microprocessor 303), receive circuitry 302, and transmit circuitry 301. Logic circuitry 303 preferably comprises a microprocessor controller, such as, but not limited to a Freescale PowerPC microprocessor. In the preferred embodiment of the present invention logic circuitry 303 serves as means for controlling transceiver 300, and as means for analyzing message content to determine any actions needed. Additionally receive and transmit circuitry are common circuitry known in the art for communication utilizing a well known communication protocol, and serve as means for transmitting and receiving messages. For example, receiver 302 and transmitter 301 are well known transmitters that utilize a communication protocol similar to IEEE 802.22. Other possible transmitters and receivers include, but are not limited to transceivers utilizing Bluetooth, IEEE 802.11, or HiperLAN protocols.

Finally, spectrum analyzer 305 is provided which serves to analyze a received signal in order to determine a receive power for the signal. For example, spectrum analyzer may comprise simple circuitry such as a band-pass filter followed by a power detector circuit.

In the preferred embodiment of the present invention transceiver 300 may serve as base station 101 or mobile unit 102. Flow charts detailing operation of transceiver 300 for these scenarios are shown in FIG. 4 and FIG. 5.

Figure 4:
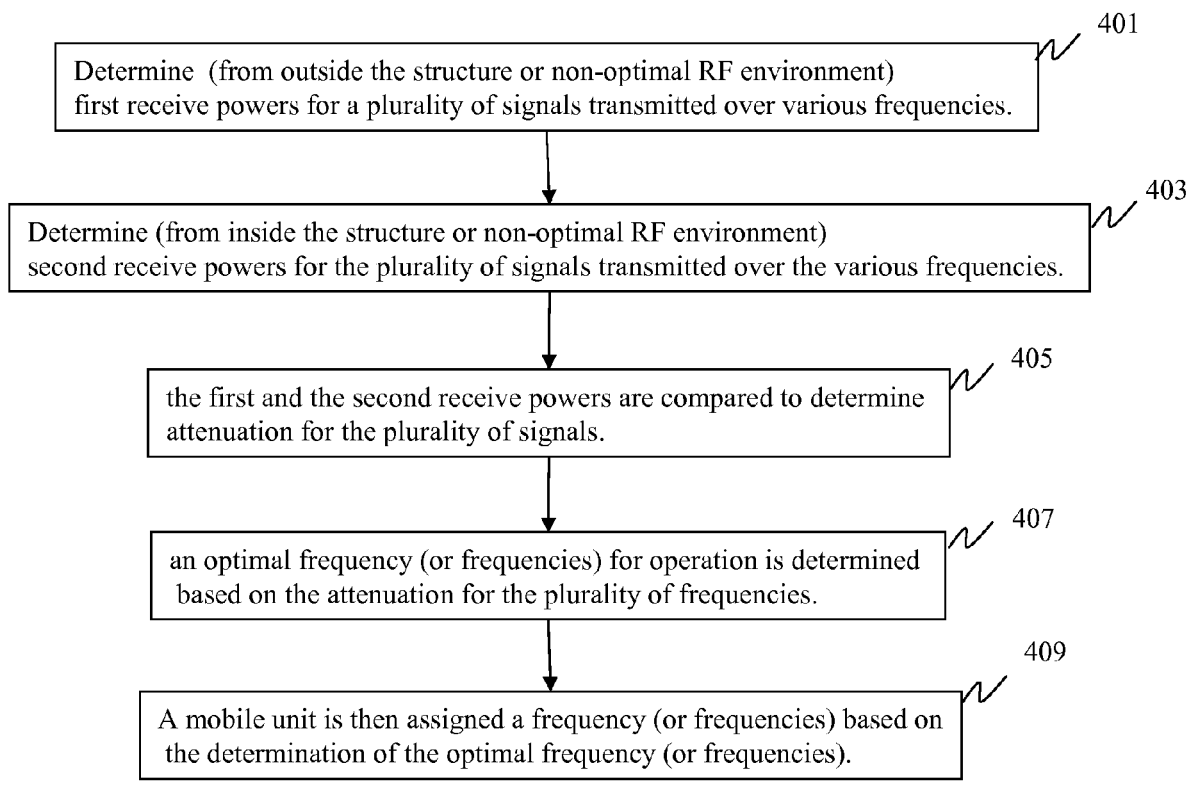
FIG. 4 is a flow chart showing the operation of a node of FIG. 2 when acting as a base station.
Figure 5:
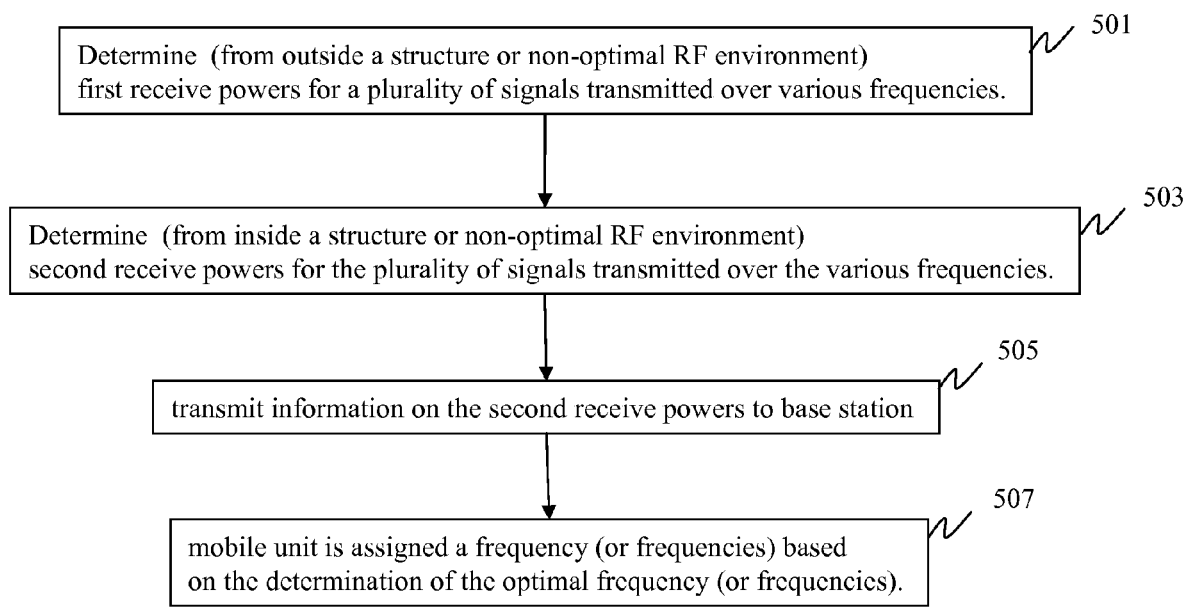
FIG. 5 is a flow chart showing the operation of a node of FIG. 2 when acting as a mobile unit.

FIG. 4 is a flow chart showing the operation of transceiver 300 when acting as a base station within communication system 100. The logic flow begins at step 401 where microprocessor 303 accesses spectrum analyzer 305 to measure first receive powers for a plurality of signals transmitted over various frequencies, wherein the determination is made from outside a structure or non-optimal RF environment. This determination may be done by logic circuitry 303 instructing spectrum analyzer 305 to determine a receive power for the plurality of signals, or alternatively, by simply being provided this information from mobile unit 102.

As discussed above, the plurality of signals preferably comprise signals transmitted on frequencies near frequencies available for communication by base station 101. The plurality of signals are not utilized for communication by communication system 100, but are utilized by at least a second communication system for communications. The plurality of signals may be television, cellular/PCS, land mobile, broadcast radio, and/or other signals.

At step 403, logic circuitry 303 determines second receive powers for the plurality of signals transmitted over the various frequencies, wherein the determination is made from inside the structure or non-optimal RF environment. This determination is made by receiving (via receiver 302) receive powers for the plurality of signals via a control-channel transmission from mobile unit 102.

At step 405 the first and the second receive powers are compared by logic circuitry 303 to determine attenuation for the plurality of signals. At step 407, an optimal, or best frequency (or channel) for operation is determined by logic circuitry 303 based on the attenuation for the plurality of frequencies. In the preferred embodiment of the present invention the best frequency for operation is nearest a signal showing a least amount of attenuation.

At step 409 mobile unit 102 is then assigned a frequency (or channel) based on the determination of the optimal frequency. As discussed above, the frequency or frequencies assigned to mobile unit 102 are not from the various frequencies monitored, but near them (e.g., within 5 MHz) in frequency. The assignment of frequencies is preferably accomplished via control channel transmission of the frequency or frequencies (via transmitter 301) from base station 101 to mobile unit 102.

FIG. 5 is a flow chart showing the operation of transceiver 300 when acting as a mobile unit within communication system 100. The logic flow begins at step 501 where microprocessor 303 determines first receive powers for a plurality of signals transmitted over various frequencies, wherein the determination is made from outside a structure or non-optimal RF environment. This determination is made by logic circuitry 303 instructing spectrum analyzer 305 to determine a receive power for the plurality of signals. As discussed above, the plurality of signals preferably comprise signals transmitted on frequencies not licensed by the base station, near frequencies available for communication by base station 101. The plurality of signals are not utilized for communication by communication system 100 for uplink and downlink transmissions, but are utilized by at least a second communication system for communications.

At step 503, logic circuitry 303 accesses spectrum analyzer 305 and determines second receive powers for the plurality of signals transmitted over the various frequencies, wherein the determination is made from inside the structure or non-optimal RF environment. Again, this determination is made by logic circuitry 303 instructing spectrum analyzer 305 to determine a receive power for the plurality of signals.

At step 505 microprocessor 303 instructs transmitter 301 to transmit information on the second receive powers to base station 101. This information may simply comprise the receive powers or, alternatively, may comprise the attenuation for each frequency monitored. Finally, at step 507, mobile unit 102 is assigned a frequency (or frequencies) based on the determination of the optimal frequency (or frequencies). The frequency is preferably received from the base station via a control-channel transmission.

It should be noted that in an alternate embodiment of the present invention, the measurement of the first receive powers for a plurality of signals transmitted over various frequencies, may be accomplished by base station 101. In this scenario, step 501 would be eliminated from the logic flow of FIG. 5. Additionally, in a further alternate embodiment, the determination of the best frequency (or frequencies) for operation may be done by the mobile unit, and simply reported back to base station 101.

While the invention has been particularly shown and described with reference to a particular embodiment, it will be understood by those skilled in the art that various changes in form and details may be made therein without departing from the spirit and scope of the invention. It is intended that such changes come within the scope of the following claims.

The invention claimed is:

1. A method for a wireless transceiver in a wideband communication system to determine a frequency band for operation within a communication system, the method comprising the steps of:
   the wireless transceiver operating within the wideband communication system, determining first receive powers for a plurality of signals transmitted over various frequencies, wherein the determination is made from outside a building;
   the wireless transceiver determining second receive powers for the plurality of signals transmitted over the various frequencies, wherein the determination is made from inside the building and wherein the plurality of signals comprise radio signals transmitted by another communication system and are at frequencies that are not licensed for use by the wireless transceiver;
   the wireless transceiver comparing the first and the second receive powers;
   the wireless transceiver determining a best frequency for operation based on the comparison, wherein the best frequency is not licensed for utilization in communication by the wideband communication system; and
   the wireless transceiver being assigned a frequency for operation, wherein the frequency for operation is based on the best frequency and lies within frequencies that can be utilized for communication by the wideband communication system.

2. The method of claim 1 wherein the step of determining the first receive powers comprises the step of measuring a power of the plurality of signals.

3. The method of claim 1 wherein the step of determining the first receive powers comprises the step of being provided the receive power for the plurality of signals.

4. The method of claim 1 wherein the plurality of signals comprise television, cellular/PCS, land mobile, or broadcast radio signals.

5. A method for a wireless transceiver in a wideband communication system to determine a frequency for operation within a communication system, the method comprising the steps of:
   the wireless transceiver operating within the wideband communication system, determining receive powers for a plurality of signals transmitted over various frequencies, wherein the determination is made from inside a structure, and wherein the plurality of signals comprise radio signals transmitted by another communication system and are at frequencies that are not licensed for use by the wireless transceiver;
   the wireless transceiver transmitting information pertaining to the receive powers for the plurality of signals to a base station, wherein the base station determines a best frequency for operation based on the receive powers and further wherein the best frequency is not licensed for utilization in communication by the wideband communication system; and
   the wireless transceiver receiving a frequency for transmission, wherein the frequency for transmission is based on the best frequency and lies within frequencies that can be utilized for communication by the wideband communication system.

6. The method of claim 5 wherein the step of determining the first receive powers comprises the step of measuring a power of the plurality of signals.

7. The method of claim 5 wherein the plurality of signals comprise television, cellular/PCS, land mobile, or broadcast radio signals.

8. An apparatus operating within a wideband communication system for determining a frequency for operation, the apparatus comprising:
   a spectrum analyzer determining first receive powers for a plurality of signals transmitted over various frequencies, wherein the determination is made from outside a building, the spectrum analyzer additionally determining second receive powers for the plurality of signals transmitted over the various frequencies, wherein the determination is made from inside the building and wherein the plurality of signals comprise radio signals transmitted by another communication system and are at frequencies that are not licensed for use by a wireless transceiver; and
   logic circuitry comparing the first and the second receive powers and determining a best frequency for operation based on the comparison, wherein the best frequency is not licensed for utilization in communication by the wideband communication system; and a receiver for receiving a frequency for operation, wherein the frequency for operation is based on the best frequency and lies within frequencies that can be utilized for communication by the wideband communication system.

9. The apparatus of claim 8 wherein the plurality of signals comprise television, cellular/PCS, land mobile, or broadcast radio.

10. An apparatus operating within a wideband communication system comprising:

a spectrum analyzer operating within the wideband communication system, determining first receive powers for a plurality of signals transmitted over various frequencies, wherein the determination is made from outside a building, and wherein the plurality of signals comprise radio signals transmitted by another communication system and are at frequencies that are not licensed for use by a wireless transceiver;

a transceiver, receiving second receive powers for the plurality of signals transmitted over the various frequencies, wherein the determination is made from inside the building;

logic circuitry comparing the first and the second receive powers and determining a best frequency for operation based on the comparison, wherein the best frequency is not licensed for utilization in communication by the wideband communication system; and a transmitter transmitting a frequency for operation to a mobile unit, wherein the frequency is based on the best frequency and lies within frequencies that can be utilized for communication by the wideband communication system.

11. The apparatus of claim 10 wherein the plurality of signals comprise television, cellular/PCS, land mobile, or broadcast radio signals.

* * * * *